US010694023B2

(12) United States Patent
Baeder et al.

(10) Patent No.: US 10,694,023 B2
(45) Date of Patent: Jun. 23, 2020

(54) TESTING METHODS AND SYSTEMS FOR MOBILE COMMUNICATION DEVICES

(71) Applicant: Rohde & Schwarz GmbH & Co. KG, Munich (DE)

(72) Inventors: Uwe Baeder, Erding (DE); Holger Jauch, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 14/796,038

(22) Filed: Jul. 10, 2015

(65) Prior Publication Data

US 2017/0013121 A1 Jan. 12, 2017

(51) Int. Cl.
| | | |
|---|---|---|
| H04M 3/24 | (2006.01) | |
| H04M 3/00 | (2006.01) | |
| H04W 24/00 | (2009.01) | |
| H04M 3/28 | (2006.01) | |
| H04W 24/06 | (2009.01) | |

(52) U.S. Cl.
CPC .............. *H04M 3/00* (2013.01); *H04M 3/28* (2013.01); *H04W 24/00* (2013.01); *H04M 2203/6063* (2013.01); *H04W 24/06* (2013.01)

(58) Field of Classification Search
USPC ........................................... 455/67.11, 67.14
See application file for complete search history.

(56) References Cited

U.S. PATENT DOCUMENTS

| | | | | |
|---|---|---|---|---|
| 9,060,301 B2* | 6/2015 | Doshi | ................... | H04W 24/06 |
| 9,219,745 B2* | 12/2015 | Huque | ................ | H04L 63/1433 |
| 9,313,643 B1* | 4/2016 | Ghoshal | ................ | H04W 4/003 |
| 2005/0131671 A1* | 6/2005 | Kashyap | ................. | G06F 21/35 |
| | | | | 703/24 |
| 2006/0071772 A1* | 4/2006 | Janes | .................... | H04W 24/06 |
| | | | | 340/515 |
| 2007/0207798 A1* | 9/2007 | Talozi | ................. | G06F 11/3688 |
| | | | | 455/423 |
| 2009/0075646 A1* | 3/2009 | Lohlein | ................... | H04M 1/24 |
| | | | | 455/423 |
| 2011/0111750 A1* | 5/2011 | Jacob | ................. | H04L 12/2697 |
| | | | | 455/423 |

(Continued)

FOREIGN PATENT DOCUMENTS

| | | |
|---|---|---|
| CN | 103428745 A | 12/2013 |
| DE | 10 2009 008 948 A1 | 8/2010 |
| DE | 10 2009 037 234 A1 | 2/2011 |

*Primary Examiner* — Yuwen Pan
*Assistant Examiner* — Erica L Fleming-Hall
(74) *Attorney, Agent, or Firm* — Westman, Champlin & Koehler, P.A.

(57) ABSTRACT

A testing method for testing mobile communication devices comprises transmitting, by a testing front end module, a testing profile associated with a Universal Integrated Circuit Card, UICC, to a mobile communication device, activating the testing profile on the mobile communication device, setting, by a testing controller, the configuration of the mobile communication device to a testing mode according to the information of the activated testing profile of the UICC, and performing operational tests on the mobile communication device using a testing front end module of a testing system while the configuration of the mobile communication device is set to the testing mode.

14 Claims, 2 Drawing Sheets

(56) References Cited

U.S. PATENT DOCUMENTS

| | | | | |
|---|---|---|---|---|
| 2011/0143754 A1* | 6/2011 | Jiang | H04M 15/00 | 455/432.1 |
| 2012/0115441 A1* | 5/2012 | Schell | H04L 63/0853 | 455/411 |
| 2012/0331292 A1* | 12/2012 | Haggerty | H04L 63/0272 | 713/168 |
| 2013/0078996 A1* | 3/2013 | Doshi | H04W 24/06 | 455/426.1 |
| 2013/0227646 A1* | 8/2013 | Haggerty | H04L 63/0853 | 726/3 |
| 2013/0273853 A1* | 10/2013 | Reed | H04W 24/00 | 455/67.11 |
| 2013/0283047 A1* | 10/2013 | Merrien | H04W 12/08 | 713/164 |
| 2014/0041036 A1* | 2/2014 | Huque | H04L 63/1433 | 726/25 |
| 2015/0271662 A1* | 9/2015 | Lhamon | H04W 8/183 | 370/329 |
| 2015/0333397 A1* | 11/2015 | Buchsbaum | H01Q 1/50 | 343/788 |
| 2016/0173156 A1* | 6/2016 | Wane | H04M 15/63 | 455/558 |
| 2016/0309327 A1* | 10/2016 | Grimault | H04L 63/123 | |

* cited by examiner

TESTING METHODS AND SYSTEMS FOR MOBILE COMMUNICATION DEVICES

FIELD OF THE INVENTION

The present invention relates to testing methods and testing systems for mobile communication devices. Such methods and systems may be employed for testing mobile communication devices employing Universal Integrated Circuit Cards (UICCs).

BACKGROUND OF THE INVENTION

Mobile communication devices often use modules for authentication of a user, commonly referred to as Universal Integrated Circuit Card (UICC). A UICC comprises a smart card inserted into and internally connected to a mobile communication device. The UICC includes a storage module for storing personal information of a user and operator information about any mobile networks that the user is subscribed to. For example, the stored personal information on the UICC may include an International Mobile Subscriber Identity (IMSI) identifying the user. Other terms for relating to a UICC may be a Subscriber Identity Module (SIM) card or a Universal Subscriber Identity Module (USIM) card.

UICCs that may be physically inserted into and subsequently removed from a mobile user terminal may conveniently store pre-defined user information that is not subject to changes. An authentication of the user can be automatically performed by using the information stored in the UICC.

Non-removable UICCs are enjoying widespread use as so-called "embedded UICCs" (eUICC). Personalized user information may be stored in the eUICC in a form of IMSI which may be pre-assigned to a specific mobile network operator designated in the manufacturing step of the mobile user terminal and, hence, the eUICC as integral part of the terminal.

With eUICCs it is desirable to update or change user information about subscribers of various mobile network operators in remote fashion. eUICCs thus carry profile management modules for managing different profiles in a eUICC associated with different users and/or different mobile network operators.

For example, document DE 10 2009 037 234 A1 discloses a method for exchanging data between a PC and a central server having user IDs stored thereupon. Document DE 10 2009 008 948 A1 discloses a method of activating a subscriber identity module to primary services in a mobile communication network with a service profile of limited functionality. Document CN 103 428 745 A discloses a test system and a test method of a Cu interface between a UICC and a WCDMA mobile terminal.

Electronic equipment, such as mobile communication devices, is subject to various electronic tests after production. Such tests are generally necessary to ensure proper configuration, calibration and functionality of various elements of the devices under test (DUT). For testing purposes, specific testing devices are employed which simulate a testing environment under predefined testing conditions. For example, testing devices may employ one or more specific testing routines with predefined testing schedules. Those testing schedules regularly involve input of particular test signal sequences into the DUT and/or reception of responses to testing signals input to the DUT. Such responses may be evaluated for consistency, constancy, timeliness and other properties of an expected behaviour of the DUT.

It would be desirable to find solutions for testing mobile communication devices that allow for efficient and reliable testing and flexible testing management.

SUMMARY OF THE INVENTION

According to the disclosure of present invention testing methods and testing systems for mobile communication devices may be implemented.

Specifically, according to a first aspect of the invention, a testing method for testing a mobile communication device includes transmitting, by a testing front end module, a testing profile associated with a Universal Integrated Circuit Card, UICC, to a mobile communication device, activating the testing profile on the mobile communication device, setting, by a testing controller, the configuration of the mobile communication device to a testing mode according to the information of the activated testing profile of the UICC, and performing operational tests on the mobile communication device using a testing front end module of a testing system while the configuration of the mobile communication device is set to the testing mode.

According to a second aspect of the invention, a testing system for testing one or more mobile communication devices a testing front end module including at least one testing profile associated with a Universal Integrated Circuit Card, UICC, and a testing controller coupled to the testing front end module. The testing front end module includes a wirebound testing device interface or an RF interface over which the one or more mobile communication devices are connectable to the testing front end module. The testing front end module further includes a provisioning interface over which the at least one testing profile is transmittable to the one or more mobile communication devices.

One idea of the present invention is to provide a testing system with the capability of emulating a UICC for mobile communication devices under test in the testing system. The emulated UICC provides the mobile communication devices under test with a specific testing profile that is dedicated to set the mobile communication device in a testing mode, thereby enabling a testing system to test the functionality of the mobile communication device with regard to UICC-related functions, such as network provisioning, network access or network policies.

Amongst others, there are several specific advantages associated with such testing systems and their concomitant testing methods. The testing profiles may be tied to the testing systems by way of an authentication of such testing profiles only being possible with authentication certificates of the testing systems. That way, the testing profiles may only be activated in the associated testing systems, preventing misuse or tampering by unauthorised access. Moreover, the testing profiles may be supervised and managed in the testing system without the need for external UICC providers/operators to implement the testing profiles on the UICCs which are to be actually employed in the mobile communication devices during the intended operation in the field.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the accompanying drawings. Elements in the drawings are illustrated for simplicity and clarity and have not necessarily been drawn to scale.

In all figures of the drawings elements, features and components which are the same or at least have the same functionality have been provided with the same reference symbols, unless explicitly stated otherwise.

DETAILED DESCRIPTION OF THE EMBODIMENTS

Mobile communication devices within the meaning of the present invention include any mobile electronic equipment capable of wirelessly communicating via a mobile communication network. Mobile communication devices may include laptops, notebooks, tablets, smartphones, mobile phones, pagers, PDAs, digital still cameras, digital video cameras, portable media players, gaming consoles, virtual reality glasses, mobile PCs, mobile modems, machine-to-machine (M2M) devices and similar electronic equipment.

Figure 1:
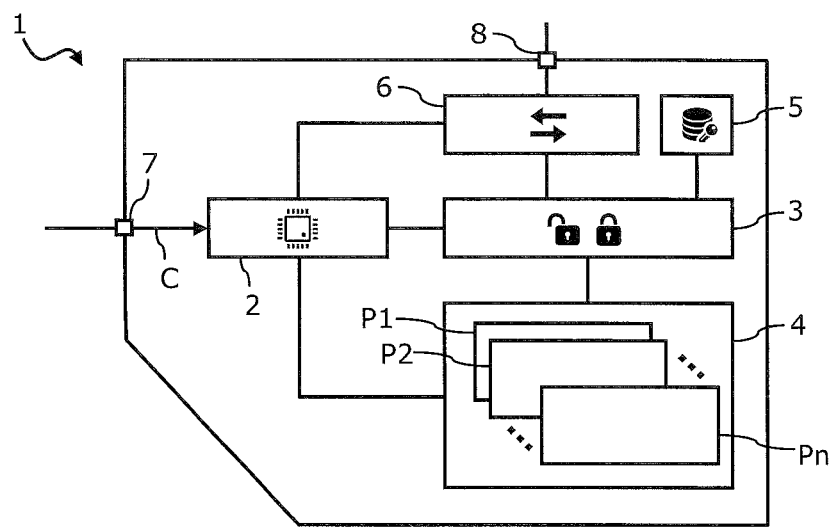
FIG. 1 schematically illustrates a Universal Integrated Circuit Card (UICC) as it may be employed according to an embodiment of the invention.

FIG. 1 schematically illustrates a UICC 1. The UICC 1 may either be a physically separate component which may be freely inserted into and removed from a mobile communication device. In particular, the UICC 1 may be connectable to a testing front end module of a testing system via an external interface. Alternatively, the UICC 1 may be implemented as a virtual UICC, i.e. an emulation environment in software that acts and outputs signals like a physically implemented UICC would. Since the UICC 1 is only used for testing purposes and would thus not necessarily need full operational capabilities as a regular UICC 1 would, it may be specifically designed and configured for use in a testing system environment.

The UICC 1 may be a removable or non-removable card with a silicon chip holding subscriber information of a subscribing user in a mobile network and/or information used for testing UICC-related functionality of a mobile communication device. To that end, the UICC 1 may have a non-volatile profile memory 4 and a general-purpose processor 2. The UICC 1 may further comprise an authentication module 3, a function manager 6 and a key storage module 5.

The general-purpose processor 2 may be either directly coupled to the profile memory 4 or indirectly via the authentication module 3. The general-purpose processor 2 may be a central processing unit, an ASIC, a FPGA or any similar programmable logic device. The general-purpose processor 2 may run a UICC-specific operation system used for operating the UICC. The general-purpose processor 2 may in particular be configured to access one or more profiles P1, P2, . . . , Pn as stored in the profile memory 4.

Profiles within the meaning of the invention, such as the profiles P1, P2, . . . , Pn, may be any combination of a file structure, data and applications to be provisioned on the UICC 1. The profiles P1, P2, . . . , Pn may for example include provisioning profiles which are used to enable a mobile communication device to gain access a mobile communication network. The profiles P1, P2, . . . , Pn may for example include subscription profiles which enable a mobile communication device to access telecommunication and related services offered in a mobile communication network.

The profiles P1, P2, . . . , Pn may for example also include testing profiles which enable the mobile communication device in which the UICC 1 is employed to be tested under (virtual) operation conditions and to compare the observed behaviour with a predefined operational profile. The testing profiles may be configured to respond to testing and analysing signals and values input from an external tester, report differences in output, system and UICC characteristics and to generate logging files for a testing system to read out.

The general-purpose processor 2 may be configured to select one of the profiles P1, P2, . . . , Pn, in particular a testing profile, as an activated profile for the UICC 1. The general-purpose processor 2 may for those purposes be connected to a control interface 7 which is configured to receive an external controlling signal C to determine which of the profiles P1, P2, . . . , Pn should be selected as activated profile. The general-purpose processor 2 may access the profile memory 4 and retrieve one of the profiles P1, P2, . . . , Pn for activation. The general-purpose processor 2 may further access the profile memory 4 for changing one of the existing profiles P1, P2, . . . , Pn, deleting one of the existing profiles P1, P2, . . . , Pn or storing an entirely new profile in the profile memory 4.

The profiles P1, P2, . . . , Pn may be stored in the profile memory 4 in encrypted format. To that end, the authentication module 3 may be configured to authenticate any profile to be stored in the profile memory 4, for example by using an authentication key specific to the UICC 1. Such UICC-specific keys may for example be stored in the key storage module 5 which is connected to the authentication module 3 and to which the authentication module 3 may have read access for retrieval of the authentication key(s). The authentication module 3 may further be controlled by the general-purpose processor 2 to decrypt any encrypted profile P1, P2, . . . , Pn that is to be retrieved by the general-purpose processor 2.

Once authenticated and possibly decrypted, the retrieved profile P1, P2, . . . , Pn may be set as operative profile in the general-purpose processor 2. According to the operative profile and its content, the general-purpose processor 2 may configure the function manager 6 in order to define the current scope of functionality of the UICC 1. The function manager 6 may be coupled to the general-purpose processor 2 and/or the authentication module 3 and may provide the respective functionality of the UICC 1 via an access interface 8 of the UICC 1.

For example, if the general-purpose processor 2 retrieves a testing profile from the profile memory 4 and puts the UICC 1 in a testing mode, the function manager 6 may provide a testing access in a testing environment for external testing devices to the UICC 1. If the general-purpose processor 2 retrieves a subscription profile from the profile memory 4, the function manager 6 may offer access functions to the UICC 1 which enable a mobile communication device for which the UICC 1 is employed to access telecommunication and related services offered in a mobile communication network.

The number of profiles P1, P2, . . . , Pn stored in the profile memory 4 is generally not limited. Moreover, the profiles P1, P2, . . . , Pn may be transmitted to the general-purpose processor 2 for storage in the profile memory 4 over the air (OTA) and/or via a wirebound transmission line, such as for example a USB interface. The profiles P1, P2, . . . , Pn to be stored in the profile memory 4 may be transmitted in already encrypted format so that the authentication module 3 may only need to verify the correctness of the encryption before storing the transmitted profiles P1, P2, . . . , Pn in the profile memory 4.

Figure 2:
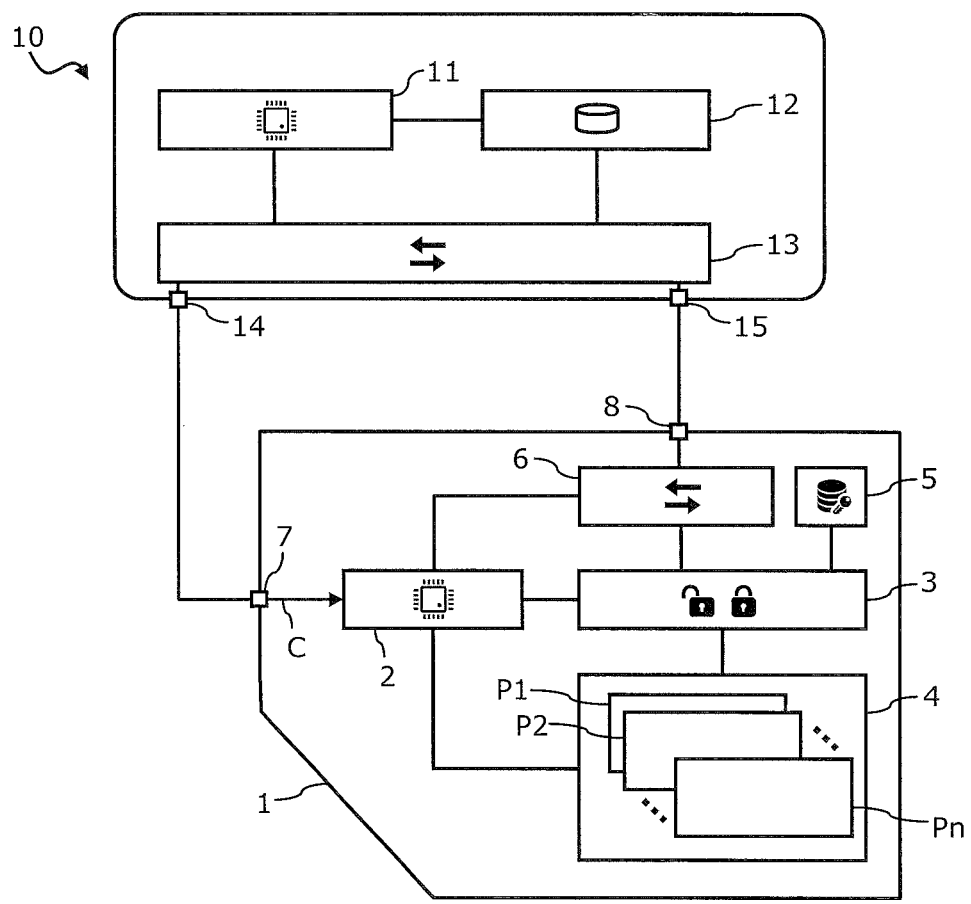
FIG. 2 schematically illustrates a mobile communication device with an external emulated UICC according to another embodiment of the invention.

FIG. 2 schematically illustrates a mobile communication device 10, such as a smartphone, a tablet or a machine-to-machine (M2M) device, employing an external UICC 1. The UICC 1 may be removably inserted into a physical receptacle of the mobile communication device 10. Alternatively, the UICC 1 may be physically separate from the mobile communication device 10 and may be connected to respective UICC connection interfaces of the mobile communication device 10 via a wirebound connection, such as a USB interface, or a wireless connection, such as a Bluetooth, NFC, RF or similar interface. The mobile communication device 10 may comprise a UICC manager module 13 that is coupled to the various interfaces of the UICC 1, such as the access interface 8 of the UICC 1. The UICC manager module 13 may also be coupled to the general-purpose processor 2 of the UICC 1 via the control interface 7.

The mobile communication device 10 may further comprise a terminal processor 11 and a terminal memory 12 which are both connected to each other on one hand and to the UICC manager module 13 on the other hand. The terminal processor 11 may be configured to control the operation of the mobile communication device 10, dependent on the information as provided by the UICC 1 via the UICC manager module 13. Certain access information or subscriber specific data may be temporarily stored in the terminal memory 12 for performing the intended functions of the mobile communication device 10.

Mobile communication devices such as the mobile communication device 10 may need to be tested after manufacture and before shipping in order to ensure proper functionality. Many of the intended functions of the mobile communication device 10 may, however, depend on the interaction of the mobile communication device 10 with external devices and networks, particularly depending on the operational state of the mobile communication device 10 and the set profile in the UICC 1 of the mobile communication device 10.

As the UICC 1 usually holds data items specific to a user or subscriber of the mobile communication device 10, testing such functionality may not be fully possible without activating the subscriber-specific UICC 1. Such premature activation of subscriber-specific profiles in the UICC 1 before the subscriber has even gotten hold of the mobile communication device 10 may be undesirable. To alleviate those problems, testing systems for testing communication related functionality of the mobile communication device 10 may utilize testing profiles of a UICC 1 that emulate subscriber-specific information, but are not yet bound to any specific subscriber.

Such testing profiles of a UICC 1 may provide enhanced access to functions of the mobile communication device 10 which allow testing systems to measure specific performance characteristics of the mobile communication device 10, for example measuring RSSIs under specific simulated testing conditions or encryption schemes during mobile communication with external base stations.

With the UICC 1 being external to the mobile communication device, the UICC 1 may be provided in a testing environment by a testing system. One of the testing components of the testing system may provide external access to a specific testing UICC 1 for one or more mobile communication devices during a testing procedure. The specific testing UICC 1 may be a corporeal hardware component within one of the testing components in the testing system. Alternatively, the testing component may employ an emulation component that is capable of emulating a virtual UICC 1 the output of which may be routed to the one or more mobile communication devices during a testing procedure. Such corporeal or virtual UICCs 1 may be equipped with testing profiles that may be provided to the connected mobile communication devices under test during and only for the duration of the testing procedure in the testing system.

Figure 3:
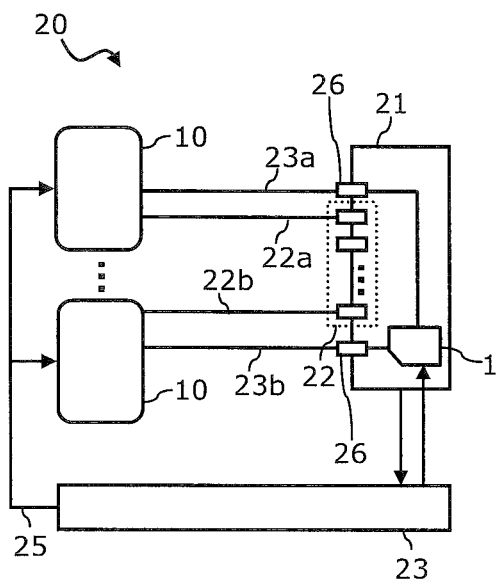
FIG. 3 schematically illustrates a testing system for a mobile communication device according to a further embodiment of the invention.
Figure 4:
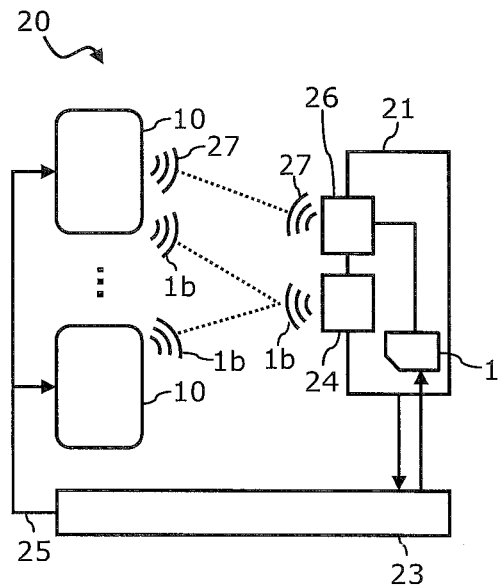
FIG. 4 schematically illustrates a testing system for a mobile communication device according to yet another embodiment of the invention.

FIGS. 3 and 4 schematically illustrate testing systems 20 which may be used to perform tests on one or more device under test (DUTs), such as mobile communication device 10 that usually employ UICCs 1. The testing systems 20 may particularly be configured and adapted to perform a testing method M1 as shown and explained in conjunction with FIG. 5 below. Generally, the testing systems 20 may employ a testing front end module 21 operationally connectable to one or more mobile communication devices 10. The testing systems 20 further comprise a testing controller 23 which is on one hand connected to the testing front end module 21 and to each of the mobile communication devices 10 under test on the other hand.

The testing front end module 21 may generally comprise one or more vector signal generators (VSG) for generating and outputting testing signals to the mobile communication devices 10 operatively connected to the testing front end module 20. Furthermore, the testing front end module 21 may comprise one or more a vector signal analysers (VSA) for receiving, filtering and evaluating testing response signals from the mobile communication devices 10 as response to one of the testing signals output by the VSG(s). The testing front end module 21 may in particular emulate a base station of a mobile communication network for testing proper functionality of the connected mobile communication devices 10 with regard to network provisioning, network accessibility and network communication.

As shown in the exemplary configuration of FIG. 3, the testing front end module 21 may have a wirebound testing device interface 22 over which the mobile communication devices 10 may be connected to the testing front end module 21, for example by RF cables 22a, 22b. The RF cables 22a, 22b may in particular provide transmission/reception functionality emulating a RF communication channel. The testing controller 23 of FIG. 3 may further be connected to the mobile communication devices 10 via cables 25 in order to set up the mobile communication devices 10 for testing purposes.

In contrast to the exemplary configuration of FIG. 3, the testing system 20 as illustrated in FIG. 4 may employ a RF interface 24 which may communicate wirelessly ("over the air", OTA) with the mobile communication devices 10, for example using wireless communication 1b. The RF interface 24 may for example be a NFC interface, an RFID interface, a UWB interface, a Bluetooth® interface or any similar interface type.

The testing front end module 21 includes a corporeal or virtual testing UICC 1 that is connected to the mobile communication devices 10 via a provisioning interface 26. Specifically, the mobile communication devices 10 have their respective UICC manager modules 13 in FIG. 2 connected to the testing UICC 1 over the provisioning interface 26. In other words, the testing UICC 1 of the testing front end module 21 provides similar functions to the mobile communication devices 10 as if a conventional UICC would be inserted into or embedded in the mobile communication devices 10.

As exemplarily shown in FIG. 3, the testing UICC 1 may be connected to the mobile communication devices 10 via cables 23a, 23b that connect the provisioning interface 26 with the respective UICC manager modules 13. Alternatively, and as exemplarily depicted in FIG. 4, the testing UICC 1 may be connected to the mobile communication devices 10 over the air, i.e. via a wireless communication link 27, with provisioning interface 26 having a respective wireless communication module to communicate wirelessly with the respective UICC manager modules 13 of the mobile communication devices 10. The wireless communication link 27 may for example be based on a Bluetooth, NFC, UWB or similar communication protocol.

In the testing systems 20, the testing controller 23 is configured to send a control signal C to the testing front end module 21 in order to request the general-purpose processor 2 of the UICCs 1 to select and activate a testing profile for the testing procedure in the testing system 20 and to set up a testing mode in the connected mobile communication devices 10 for purposes of device testing. The testing profile to be selected and activated may be pre-stored in the profile memory 4 of the UICCs 1. Alternatively, the testing controller 23 may transmit a specific testing profile of the testing system 20 to the testing front end module 21. The specific testing profile transmitted by the testing controller 23 may for example be transmitted via a wirebound transmission line or via a wireless communication link.

The testing front end module 21 may for example store different testing profiles as sets of data for different testing procedures, depending on what type of functionality of the mobile communication devices 10 is to be tested. The testing controller 23 may be able to select one of the different testing profiles depending on which testing procedure is to be performed. In case of a virtual UICC 1 within the testing front end module 21, the testing front end module 21 may run specific emulation software that uses the different testing profiles to generate an emulated UICC output over the provisioning interface. In case of a corporeal UICC 1, the UICC 1 does not need to be implemented within the testing front end module 21, but may rather be connected via a data interface, such as a USB interface, to the testing front end module 21.

Details of the testing front end module 21 and the testing controller 23 are not specifically shown in FIGS. 3 and 4—it should be understood that different configurations may be possible for the testing front end module 21 depending on the type and nature of the DUTs 10 and tests to be performed. The testing profiles of the UICCs 1 may in particularly be specifically tailored towards the testing systems 20, and in particular to the type of tests to be performed by the testing front end module 21. The security level of the testing profiles for the UICCs 1 during the testing procedure may be such that only the testing controller 23 of the testing system 20 may be able to provide a corresponding authentication key for the authentication module 3 of the UICCs 1 to authenticate and, hence, activate the testing profile.

Figure 5:
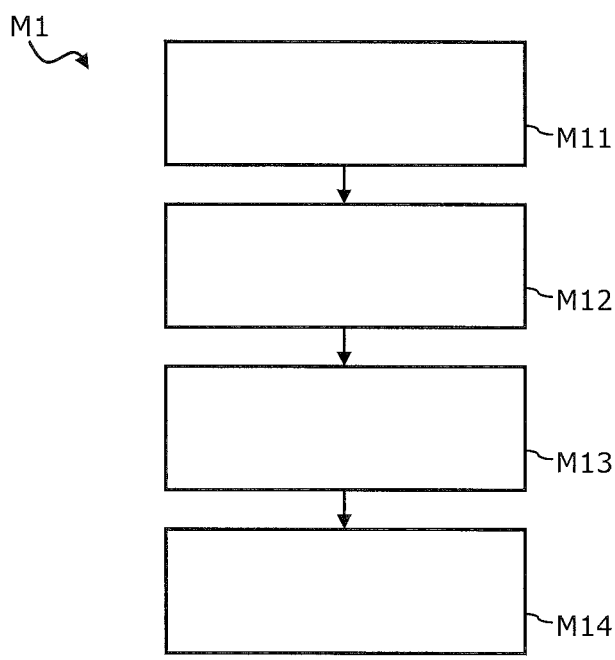
FIG. 5 shows a flowchart of procedural stages of a testing method for testing a bile communication device according to a further embodiment of the invention.

FIG. 5 schematically illustrates procedural stages of a testing method M1 for testing mobile communication devices, particularly mobile communication devices 10 as shown and explained in conjunction with FIG. 2. The mobile communication devices 10 to be tested with the testing method M1 may in particular employ UICCs such as the UICC 1 as shown and explained in conjunction with FIG. 1. The testing method M1 may be performed using the testing systems 20 of FIGS. 3 and/or 4. The testing method M1 may advantageously be used for testing mobile communication devices as devices-under-test (DUTs) in functionality tests for accessing, provisioning and utilizing mobile communication networks.

In the testing method M1, a first step M11 includes transmitting, by a testing front end module, a testing profile associated with a Universal Integrated Circuit Card, UICC, to a mobile communication device. In a second step M12, the testing profile is activated on the mobile communication device. In a third step M13, a testing controller sets up the configuration of the mobile communication device to a testing mode according to the information of the activated testing profile of the UICC. Finally, operational tests are performed in a fourth step M14 on the mobile communication device using a testing front end module of a testing system while the configuration of the mobile communication device is set to the testing mode.

The testing profile may for example be stored in a profile memory of the UICC when the UICC is a corporeal hardware component of the testing front end module. Alternatively, the UICC may be emulated by the testing front end module as a virtual UICC, so that the testing profile is stored as a data structure in the testing front end module.

The testing profile may be transmitted via a wireless communication link or via a wired connection between the mobile communication device and the testing front end module. For example, the testing profile may be authenticated by an authentication module of the UICC before activation, such as by using a UICC-specific authentication key stored in a key storage module of the UICC.

The testing profile(s) may be specifically tailored in the data structure and data content towards the testing procedures to be performed by the testing front end module 21 of the testing system 20. Particularly, the testing profile may emulate various communication conditions which the mobile communication device 10 may be subject to in the real world, such as fading conditions, noise influence or base station handover. Those conditions may be evaluated in the testing system 20 by eliciting responses of the mobile communication device 10 to specific testing signals under differing conditions as defined in the testing profiles.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections between various elements as shown and described with respect to the drawings may be a type of connection suitable to transfer signals from or to the respective nodes, units or devices, for example via intermediate devices. Accordingly, unless implied or stated otherwise the connections may for example be direct connections or indirect connections.

Because the apparatuses implementing the present invention are, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Also, the invention is not limited to physical devices or units implemented in non-programmable hardware, but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device. Those skilled in the art will recognize that the boundaries between logic or functional blocks are merely illustrative and that alternative embodiments may merge logic or functional blocks or impose an alternate decomposition of functionality upon various logic or functional blocks.

In the description, any reference signs shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as at least one and one or more in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried, unless specifically recited in the claim.

Skilled artisans will appreciate that the illustrations of chosen elements in the drawings are only used to help to improve the understanding of the functionality and the arrangements of these elements in various embodiments of the present invention. Also, common and well understood elements that are useful or necessary in a commercially feasible embodiment are generally not depicted in the drawings in order to facilitate the understanding of the technical concept of these various embodiments of the present invention. It will further be appreciated that certain procedural stages in the described methods may be described or depicted in a particular order of occurrence while those skilled in the art will understand that such specificity with respect to sequence is not actually required.

What is claimed is:

1. A testing method for testing a mobile communication device, the method comprising:
    connecting a Universal Integrated Circuit Card (UICC) manager module of a mobile communication device to a UICC that emulates subscriber-specific information to the mobile communication device over a provisioning interface of a testing front end module to an access interface of the UICC, wherein the UICC is external to the mobile communication device and arranged in the testing front end module,
    transmitting by the testing front end module, a testing profile of the UICC over the provisioning interface to the mobile communication device;
    activating the testing profile on the mobile communication device;
    setting, by a testing controller, the configuration of the mobile communication device to a testing mode according to the information of the activated testing profile of the UICC; and
    performing operational tests on the mobile communication device using a testing front end module of a testing system while the configuration of the mobile communication device is set to the testing mode.

2. The testing method of claim 1, wherein the testing profile is stored in a profile memory of the UICC, and wherein the UICC comprises a corporeal hardware component of the testing front end module.

3. The testing method of claim 1, wherein the testing profile is stored as a data structure in the testing front end module, and wherein the testing front end module is configured to emulate the UICC as a virtual UICC.

4. The testing method of claim 1, wherein transmitting the testing profile is performed via a wireless communication link or via a wired connection between the mobile communication device and the testing front end module.

5. The testing method of claim 1, wherein the testing profile is authenticated by an authentication module of the UICC before activation.

6. The testing method of claim 5, wherein the authentication module authenticates the testing profile by using a UICC-specific authentication key stored in a key storage module of the UICC.

7. A testing system for testing one or more mobile communication devices, the testing system comprising:
    a testing front end module including at least one testing profile of a Universal Integrated Circuit Card (UICC) that emulates subscriber-specific information; and
    a testing controller coupled to the testing front end module,
    wherein:
        the testing front end module includes a wirebound testing device interface or an RF interface over which the one or more mobile communication devices are connectable to the testing front end module;
        the testing front end module includes a provisioning interface over which the at least one testing profile is transmittable to the one or more mobile communication devices; and
        the UICC comprises an access interface connectable to a UICC manage module of a mobile communication device over the provisioning interface, the UICC being external to the one or more mobile communication devices and arranged in the testing front end module.

8. The testing system of claim 7, wherein the testing front end module comprises a UICC as a corporeal hardware component with a profile memory, the profile memory storing the at least one testing profile.

9. The testing system of claim 7, wherein the testing profile is stored as a data structure in the testing front end module, and wherein the testing front end module is configured to emulate the UICC as a virtual UICC.

10. The testing system of claim 7, further comprising:
    a UICC including a profile memory, the profile memory storing the at least one testing profile, wherein the UICC is connected to the testing front end module via a data interface of the testing front end module.

11. The testing system of claim 7, wherein the testing front end module is configured to transmit the at least one testing profile to the mobile communication device via a wireless communication link or via a wired connection between the mobile communication device and the testing front end module.

12. The testing system of claim 7, wherein the testing front end module is configured to emulate a base station of a mobile communication network for the one or more mobile communication devices under test.

13. A testing method for testing a mobile communication device, the method comprising:
   connecting a Universal Integrated Circuit Card (UICC) manager module of a mobile communication device to a UICC that emulates subscriber-specific information to the mobile communication device over a provisioning interface of a testing front end module to an access interface of the UICC, wherein the UICC is external to the mobile communication device and arranged in the testing front end module,
   transmitting, by the testing front end module, via a wireless communication link or via a wired connection between the mobile communication device and the testing front end module, a testing profile of the UICC over the provisioning interface to the mobile communication device;
   activating the testing profile on the mobile communication device;
   setting, by a testing controller, the configuration of the mobile communication device to a testing mode according to the information of the activated testing profile of the UICC; and
   performing operational tests on the mobile communication device using a testing front end module of a testing system while the configuration of the mobile communication device is set to the testing mode.

14. A testing system for testing one or more mobile communication devices, the testing system comprising:
   a testing front end module including at least one testing profile associated with a Universal Integrated Circuit Card (UICC), wherein the UICC is external to the one or more mobile communication devices and arranged in the testing front end module, the UICC comprising an access interface connectable to UICC manager module of one or more mobile communication devices; and
   a testing controller coupled to the testing front end module,
   wherein:
      the testing front end module includes a wirebound testing device interface or an RF interface over which the one or more mobile communication devices are connectable to the testing front end module;
      the testing front end module includes a provisioning interface over which the at least one testing profile is transmittable to the one or more mobile communication devices; and
      the testing front end module being configured to transmit the at least one testing profile to the mobile communication device via a wireless communication link or via a wired connection between the mobile communication device and the testing front end module.

* * * * *